(12) United States Patent
Zadok

(10) Patent No.: US 7,027,097 B2
(45) Date of Patent: *Apr. 11, 2006

(54) SUPPORT FOR HAND HELD CAMERA

(76) Inventor: Adam Zadok, 1623 S. 56th Ct., Cicero, IL (US) 60804

( * ) Notice: Subject to any disclaimer, the term of this patent is extended or adjusted under 35 U.S.C. 154(b) by 517 days.

This patent is subject to a terminal disclaimer.

(21) Appl. No.: 09/954,917

(22) Filed: Sep. 17, 2001

(65) Prior Publication Data

US 2003/0052993 A1    Mar. 20, 2003

(51) Int. Cl.
*H04N 5/225* (2006.01)
*G03B 17/00* (2006.01)

(52) U.S. Cl. .............. 348/375; 348/373; 396/420; 396/428

(58) Field of Classification Search .......... 348/373, 348/374, 375, 376; 396/419, 420, 421, 422, 396/424, 428
See application file for complete search history.

(56) References Cited

U.S. PATENT DOCUMENTS

| | | | | |
|---|---|---|---|---|
| 3,427,102 A | * | 2/1969 | Wade | 352/95 |
| 4,187,021 A | | 2/1980 | Balser | 354/293 |
| 4,283,135 A | | 8/1981 | Lupis | 354/293 |
| 4,569,579 A | | 2/1986 | Kangas | 354/293 |
| 5,098,182 A | * | 3/1992 | Brown | 352/243 |
| 5,721,997 A | * | 2/1998 | Powell et al. | 396/420 |
| 5,742,859 A | * | 4/1998 | Acker | 396/419 |
| 5,767,906 A | * | 6/1998 | Toyofuku et al. | 348/375 |
| 6,030,130 A | | 2/2000 | Paddock et al. | 396/421 |
| 6,347,892 B1 | * | 2/2002 | Paddock et al. | 396/421 |
| 6,697,118 B1 | * | 2/2004 | Zadok | 348/375 |

FOREIGN PATENT DOCUMENTS

| | | |
|---|---|---|
| DE | 195 19 528 A1 | 11/1996 |
| FR | 2 793 870 | 11/2000 |
| GB | 2 325 393 | 11/1998 |
| WO | WO 96/154404 | 5/1996 |

* cited by examiner

*Primary Examiner*—Ngoc-Yen Vu
*Assistant Examiner*—Luong T. Nguyen
(74) *Attorney, Agent, or Firm*—Gordon & Rees LLP

(57) ABSTRACT

A hand held stabilizer support for hand held cameras comprises a first frame having a hand grip and a pivot mount spaced from the hand grip; a second frame pivotally mounted to the first frame at the pivot mount, and a camera mount on the second frame disposed below the pivot mount so that the camera remains in the desired orientation upon pivoting of the support.

14 Claims, 4 Drawing Sheets

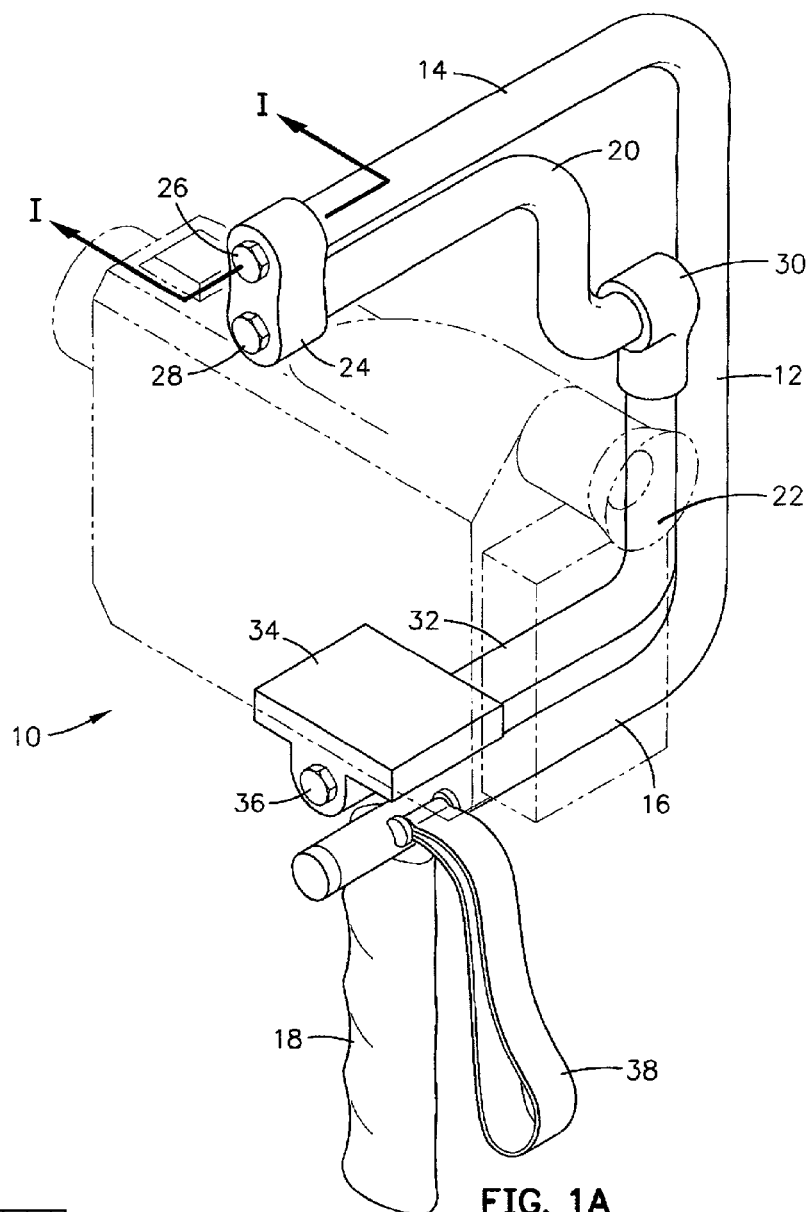
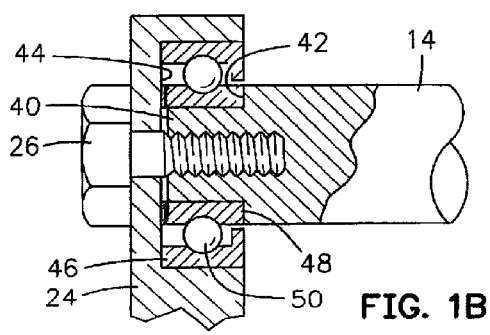
FIG. 1A
FIG. 1B

SUPPORT FOR HAND HELD CAMERA

BACKGROUND OF THE INVENTION

The present invention relates generally to movie cameras and pertains particularly to an improved support for holding and stabilizing hand held movie cameras.

It is difficult for the typical individual to hold a hand held movie or video camera reasonably steady while filming a typical target. It is particularly difficult for the average person to get good pictures while filming a moving target. This is difficult whether the operator is moving or standing still and is particularly difficult when both the target and operator are moving. This difficulty in holding hand held movie and video cameras steady often results in blurry, jerky and unstable pictures.

Some attempts have been made in the past to provide means for steadying cameras while the operator is moving. These attempts have been largely directed to large commercial cameras and involve providing a large harness with a spring supported camera support frame.

The inventor discloses in co-pending application Ser. No. 09/923,467, filed Aug. 6, 2001 a support to provide stable support for personal cameras for the average consumer. However, that device has some drawbacks to which the present invention is directed. One drawback to my prior camera support is that the camera tends to swing too easily at times. Another problem is that the camera tends to swing at excessive amplitude at times.

There is an evident need for an improved stabilizing support for personal hand held cameras.

SUMMARY AND OBJECTS OF THE INVENTION

It is the primary object of the present invention to provide a stabilizing support for personal hand held movie cameras that overcome the above problems of the prior art.

In accordance with a primary aspect of the present invention, a hand held movie camera comprises a first frame having a hand grip and at least one pivot mount spaced from said hand grip, a second frame pivotally mounted to said first frame at said pivot mount, and a camera mount on said second frame member disposed below said pivot mount so that the camera swings free of the support in at least one direction.

BRIEF DESCRIPTION OF THE DRAWINGS

The above and other objects and advantages of the present invention will become apparent from the following description when read in conjunction with the accompanying drawings wherein:

FIG. 1A is perspective view of a first exemplary embodiment of the present invention;

FIG. 1B is a section view taken on line I—I of FIG. 1A;

Figure 2:
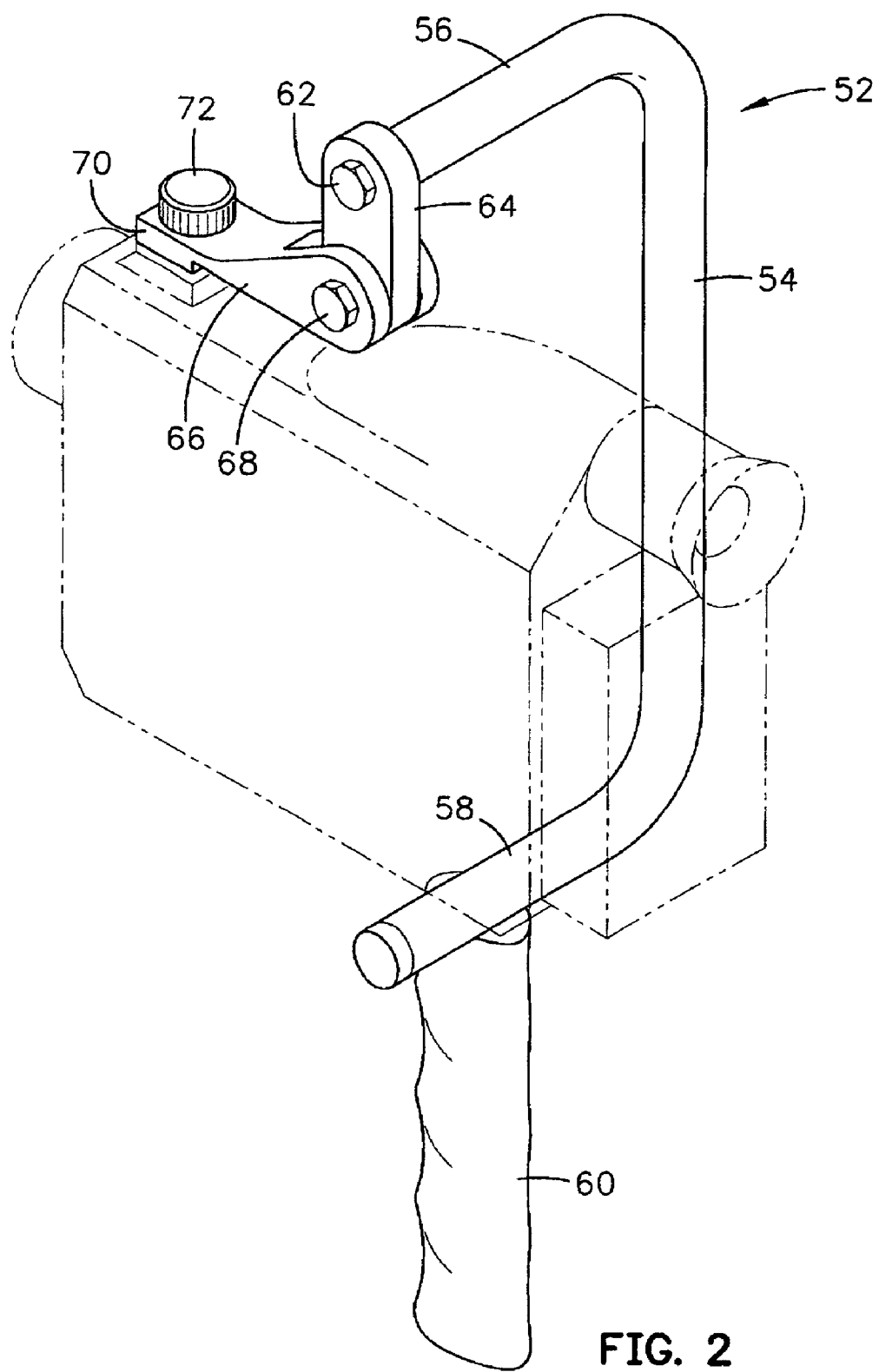
FIG. 2 is a view like FIG. 1a of an alternate embodiment of the invention.

DETAILED DESCRIPTION OF PREFERRED EMBODIMENTS.

The present invention provides an apparatus for solving the aforementioned problems of the prior art by isolating the camera from certain input motions of the operator. This is carried out by means of a support apparatus for a hand held movie camera which comprises a first frame having a hand grip and at least one pivot mount spaced from the hand grip, a second frame pivotally mounted to the first frame on at least one pivot mount, and a camera mount on the second frame disposed below the pivot mount so that said camera swings free of certain movements of the support.

Referring now more specifically to the drawings, and particularly to FIG. 1, a hand held support for a hand held camera is illustrated and designated generally by the numeral 10. The stabilizer support 12, 14 and 16 comprises a first or outer frame having a generally C configuration with a generally vertical central bar 12, an upper generally horizontal arm 14 and a lower generally horizontal arm 16. The lower arm extends generally horizontally outward and a handgrip 18 is secured between the ends thereof and extends downwardly. The illustrated hand grip is of a generally conventional design for ease of gripping and holding. The stabilizer support is designed to be preferably held generally vertically as illustrated in FIG. 1 with the camera above the handgrip. However, it may be held forward of or below the handgrip.

A second or two part inner frame 20, 22 is pivotally mounted to the first frame through a pivoting link 24 at a horizontal pivot mount or journal that includes a stud or bolt 26. The pivots or journals are preferably designed to be adjustable to adjust the freedom or ease of movement as will be discussed. The pivot mount between the inner and outer frames is preferably positioned directly above and spaced from the handgrip for balance purposes. However, it may be positioned to either side of the handgrip as desired. The second frame 20, 22 is also pivotally mounted to the lower end of link 24 by a journal including a stud or bolt 28. The second frame 20, 22 is illustrated as generally C shaped with upper and lower arms 20 and 32 pivotally journaled together at 30 with an adjustable pivot as will be explained. The pivot or journal 30 is positioned to be above the center of mass of the camera but low enough to reduce the pendulum arm effect.

The lower frame member 32 has an elongated arm extending generally horizontally and having a quick connect camera mount assembly 34 at the outer end. The quick connect mount may be of a suitable conventional construction adapted to detachably connect to a camera mount to the bottom of a video camera shown in phantom. As can be seen, the camera is mounted and hangs below the pivot 30 and is free to swing and remain level if the support is tilted forward or backward. A wrist strap 38 is attached to the frame portion 16 above the handgrip to additionally secure the support to the hand and wrist of the operator. This is especially important when the camera is held downward below waist level.

This is a simple support construction that eliminates at least one component of operator movement input to the camera. The support may also employ an additional pivot at an axis orthogonal to those illustrated as in applicant's aforementioned prior application. The multiple pivots of the inner frame member have been found to reduce some exaggerated movement of the camera in certain situations.

Referring to FIG. 1B, a section view taken on line I—I of FIG. 1A is illustrated showing details of the adjustable pivot.

The arm 14 is shown to have a reduced diameter portion 40 forming a shoulder 42. The link 24 is formed with a generally cylindrical recess 44 in which is mounted an adjustable bearing having outer race 46 and inner race 48 with rollers or balls 50 between the races. The race 48 abuts against shoulder 42 and race 46 abuts against the wall of bore 44 so that when bolt 26 is tightened the bearing is tightened to increase the force needed to rotate. This enables adjustment in the pivots of the assembly so that one may pivot more easily than another. For example it may be desirable to have pivot 30 pivot more freely that either pivots 26 or 28. This would give the inner frame a shorter normal pendulum arm and less degree of movement of the camera from operator input.

In operation, the camera support is normally held in the upright position as shown in FIG. 1. When the operator tilts the support fore or aft, the camera pivots or tilts about one or more of the pivots 26, 28 30 and remains essentially level. Adjustment of one or more of the pivots can be used to fine-tune the support to dampen the swing of the camera as desired. The support construction also enables the support to be positioned with the grip in the upper position to allow the camera to be lowered downward below the operator's waist for lower angle shots. The support has the same stabilizing effect of eliminating the longitudinal fore and aft operator input tilt as in the FIG. 1a illustrated mode of operation.

Referring to FIG. 2, an alternate embodiment of the invention is illustrated and designated generally by the numeral 52. This embodiment, as illustrated, comprises a first or outer main frame having a generally C configuration with a generally vertical center bar 54 with an upper horizontal arm 56 and a lower horizontal arm 58. The terms vertical, horizontal, upper and lower are used only in the context of preferred normal use of the support simply for ease of understanding. The lower arm extends horizontally outward and includes a handgrip 60 that is attached or secured between the ends thereof and extends downwardly. The handgrip is of a generally conventional construction but may be of custom design for ease of gripping and holding. The stabilizer support is constructed and configured to be normally held vertically as is illustrated.

A second or inner frame member 66 in the form of an arm is pivotally mounted at 68 to a link 64 that is pivotally mounted at a first horizontal pivot mount or journal at 62 on the outer end of upper arm 56. The pivot mounts are constructed as in the prior embodiment to be adjustable to enable adjustment in the damping of freedom of movement of the camera about the pivots. The pivot mounts are positioned above and spaced from the handgrip in normal operation as in the prior embodiment. The multiple adjustable pivot mounts enable selective adjustment in the damping of freedom of movement of the camera about the pivots. The second frame member 66 is detachably attached by a quick attach mount 70 having a thumb screw 72 to the top of a video cameras shown in phantom. This mounts and supports the camera below the pivots and enables the camera to swing independent of fore and aft motion of the support. This eliminates or at least considerably reduces operator input to the camera, when filming. A wrist strap 74 is attached to the frame portion 58 above the handgrip to additionally secure the support to the hand and wrist of the operator.

Figure 3:
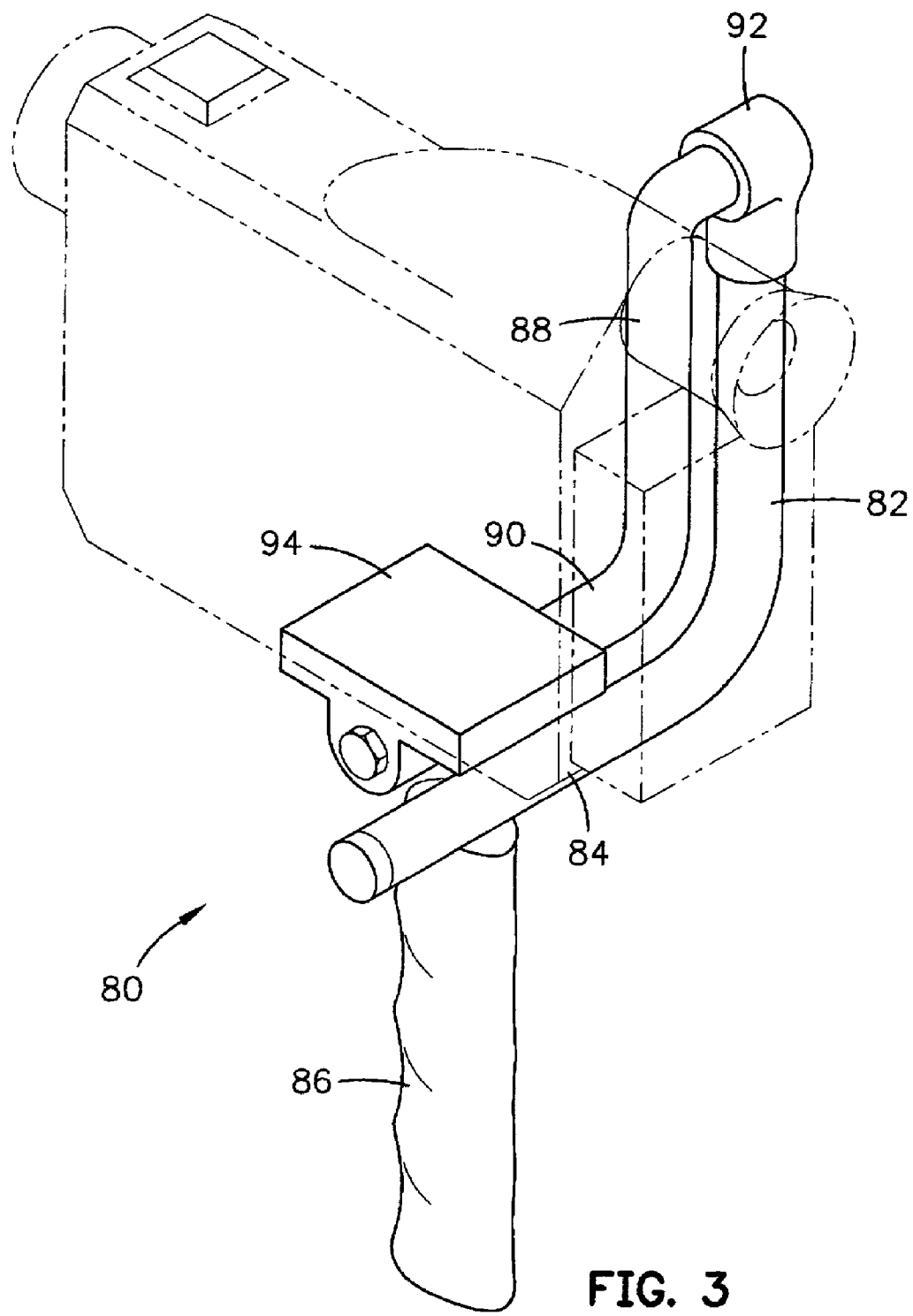
FIG. 3 is a view like FIG. 2 in another embodiment of the invention.

Referring to FIG. 3 another embodiment of the invention is illustrated and designated generally by the numeral 80. This embodiment, as illustrated, comprises a first or outer main frame having a generally L configuration with a generally vertical bar 82 with a lower horizontal arm 84. As in all embodiments, the terms vertical, horizontal, upper and lower are used only in the context of preferred normal use of the support simply for ease of understanding. The lower arm extends horizontally outward and a handgrip 86 is attached or secured between the ends thereof and extends downwardly. The handgrip is of any suitable construction but may be of either conventional or custom design for ease of gripping and holding. The support is constructed and configured to be preferably held normally vertically as is illustrated.

A generally L shaped second or inner frame having a vertical member 88 and a horizontal arm 90 is pivotally mounted to the first frame through a pivoting horizontal pivot mount or journal 92. The pivots or journals are preferably designed, as in the prior embodiments, to be adjustable to adjust the freedom or ease of movement of the camera relative to the outer frame as discussed in FIGS. 1a and 1b. The pivot mount between the inner and outer frames is preferably positioned above the center of mass of the camera and in most instances below the top of the camera. The pivot is spaced from the handgrip and positioned to either side of the handgrip to accommodate the camera. The second or inner frame member has an elongated arm extending generally horizontally and a suitable camera mount platform or assembly 94 at the outer end. The quick connect mount may be a quick connect of a suitable conventional construction adapted to detachably connect to a camera mount to the bottom of a video camera shown in phantom. As can be seen, the camera is mounted and hangs below the pivot 92 and is free to swing and remain level if the support is tilted forward or backward. A wrist strap 94 is attached to the frame portion 84 above the handgrip to secure the support to the hand or wrist of the operator. This, as previously mentioned, is especially important when the camera is held downward below waist level.

Figure 4:
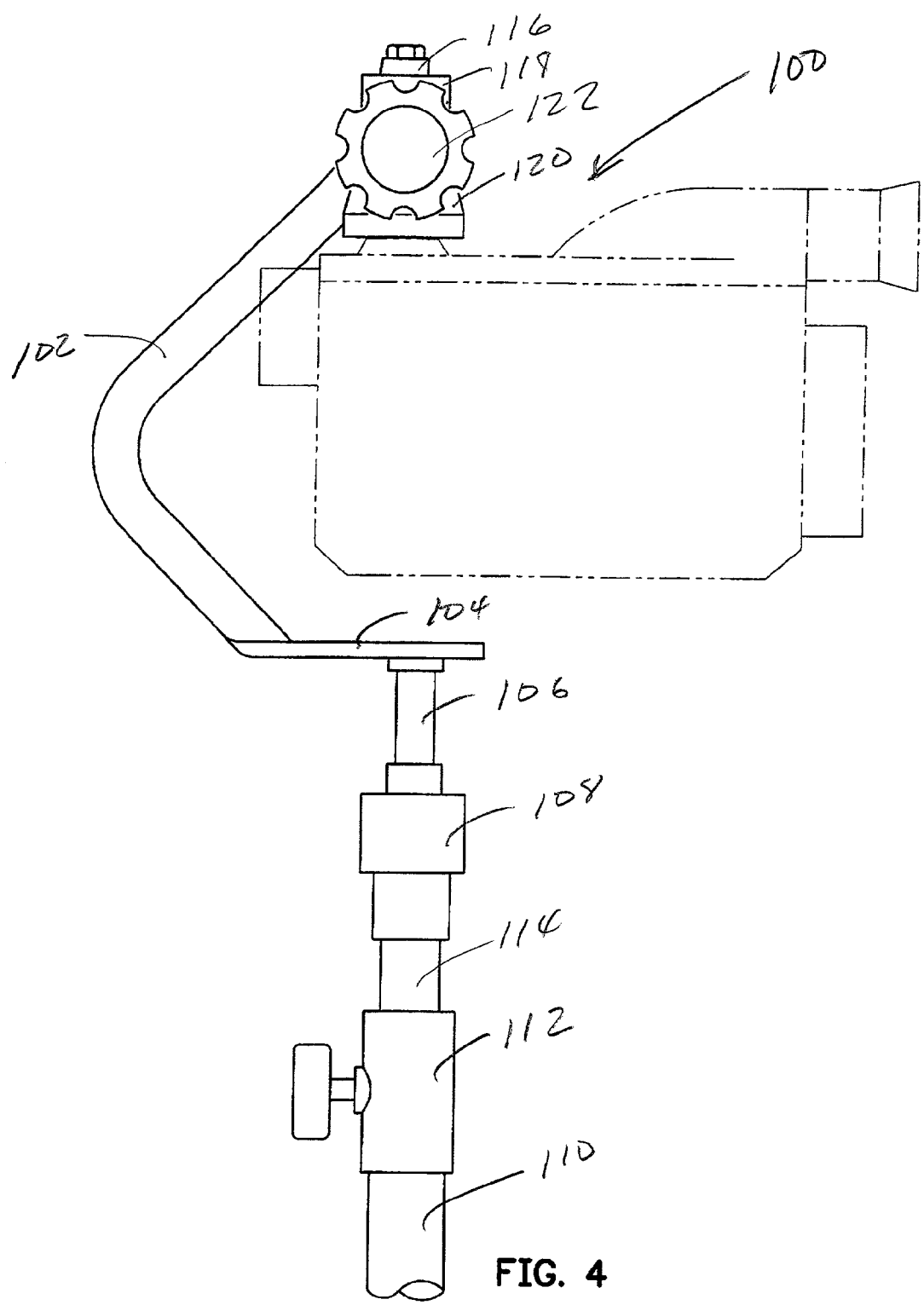
FIG. 4 is a side elevation view of a further embodiment of the invention.

Illustrated in FIG. 4 is a further embodiment of the invention further illustrating another mode of operation or use of the invention. The camera support designated generally at 100 comprises a first or outer support 102 having a central portion with a generally L configuration. An arm 104 at the lower end is attached to a post 106, which detachably mounts in a socket 108 on top of a monopod 110. The monopod is adjustable telescopically with a clamp 112 for clamping an extension 114 within tubular member 110 to adjust height. The support includes an arm 116 at the top that extends to one side and supports a pivot mount with a stationary member 118 and a pivoting member 120 pivotally mounted thereto. The pivot mount is preferably substantially like those previously illustrated and described. A hand knob 122 adjusts the ease of pivot of the camera and may provide means t clamp it in a particular position. A camera shown in phantom may be mounted and supported as illustrated and the camera pivoted up and down as desired. This and all of the previously described supports may be used for either video or still cameras. However, the FIG. 4 embodiment is particularly suitable for still cameras with telephoto lenses.

In operation, the camera is normally held in the support upright position as shown in FIGS. 1–5. When the operator tilts the support fore or aft, the camera pivots or tilts about a horizontal axis of the support and remains level. The support construction also enables the support to also be positioned with the grip in the upper position as shown in FIGS. 2 and 3 to allow the camera to be lowered below the operator's waist for lower angle shots. The support has the same stabilizing effect thereby eliminating the longitudinal axis fore and aft operator input tilt as in the FIG. 1 mode of operation.

While I have illustrated and described my invention by means of particular embodiments, it is to be understood that numerous changes and modifications may be made in the invention without departing from the spirit and scope of the invention, which is to be, limited only by the scope of the appended claims.

I claim:

1. A stabilizer holder for hand held cameras comprising:
a first elongated frame member having a normally vertical orientation, a distal end and a proximal end, a normally vertical hand grip mounted at said proximal end and a pivot mount at said distal end, wherein said first frame has a generally C configuration with an upper arm and a lower arm, and said pivot mount is on an outer end of said upper arm;
a pivoting link pivotally mounted to said pivot mount for freely pivoting about a first normally horizontal pivot axis;
a second frame pivotally mounted to said pivoting link for freely pivoting about said horizontal axis; and
a camera mount on said second frame disposed below said pivot axis for mounting a camera so that the combined center of gravity of said camera and said second frame are disposed below said horizontal pivot axis.

2. A stabilizer holder according to claim 1 wherein said pivoting link has a second pivot axis and said second frame is mounted to said pivoting link at said second pivot axis and pivots about said first and second axes.

3. A stabilizer holder according to claim 1 wherein said pivot mount is normally disposed directly above said hand grip in operation.

4. A stabilizer holder according to claim 2 wherein said second frame is a four bar linkage that maintains a camera in a normally uniform horizontal orientation when pivoting about said first axis.

5. A stabilizer holder according to claim 2 wherein said second pivot axis is parallel to said first axis and said second frame pivots about said first and second parallel axes.

6. A stabilizer holder according to claim 1 wherein said hand grip is mounted on said lower arm in substantial axial alignment with said pivot mount.

7. A stabilizer holder according to claim 1 wherein said second frame is an elongated arm extending at a right angle to said first pivot axis.

8. A stabilizer holder according to claim 7 wherein said second frame normally extends horizontally when a camera is mounted on an outer end thereof.

9. A hand held stabilizer holder for hand held cameras comprising:
an elongated first frame having a normally vertical orientation and a generally C configuration with an upper arm and a lower arm normally extending horizontally, a pivot mount at an outer end of said upper arm and a normally vertical hand grip mounted on said lower arm;
a pivoting link having a first end pivotally mounted to said pivot mount for freely pivoting about a first normally horizontal pivot axis;
a second frame pivotally mounted to said pivoting link to freely pivot about a second pivot axis; and
a camera mount on said second frame disposed to position a camera below said pivot mount so that the combined weight of said camera and said second frame is below said first pivot axis.

10. A stabilizer holder according to claim 9 wherein said second axis is orthogonal to said first axis and said second frame is pivotally mounted to pivot about said first axis and said second axis.

11. A stabilizer holder according to claim 9 wherein said second frame is a four bar linkage that maintains a camera in a normally uniform horizontal orientation when said second frame is pivoting about said first axis.

12. A stabilizer holder according to claim 11 wherein said second frame comprises a pair of generally C shaped linkage members disposed generally vertically and pivotally mounted to an upper bar forming said pivot mount and a lower bar defining a camera mount.

13. A stabilizer holder according to claim 9 wherein said second axis is parallel to said first axis and said second frame pivots about said parallel axes.

14. A stabilizer holder according to claim 2 wherein said second axis is orthogonal to said first axis and said second frame pivots about said first and second orthogonal axes.

* * * * *